Figure 1:
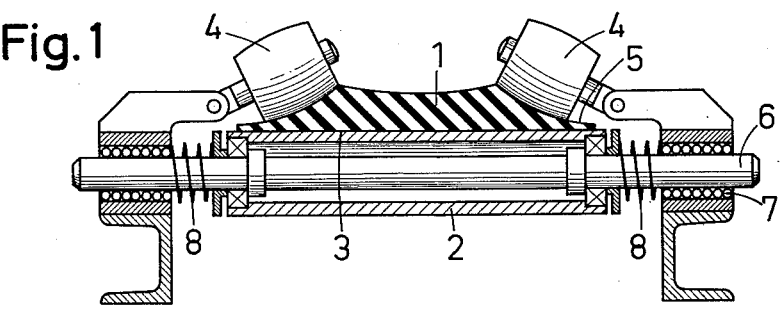

July 7, 1964 H. NÄDLER ETAL 3,139,963
ROLLER GUIDE
Filed Dec. 26, 1961

INVENTORS
HEINRICH NADLER
HEINRICH BLUM
BY
Toulmin & Toulmin
ATTORNEYS

3,139,963
ROLLER GUIDE
Heinrich Nädler, Kreis Neustadt, and Heinrich Blum, Letter, Hannover, Germany, assignors to Continental Gummi-Werke Aktiengesellschaft, Hannover, Germany
Filed Dec. 26, 1961, Ser. No. 162,141
Claims priority, application Germany Jan. 4, 1961
4 Claims. (Cl. 193—37)

The present invention relates to a roller guide, more particularly, to a roller guide for conveying strips employed in the manufacture of vehicle tires wherein the strips are guided between upper and lower pulleys and the strips are in a plastic or elastic condition.

In the manufacture of rubber tires for vehicles the strips of rubber which are to be placed over the casing of the tire to form the tread and side walls thereof are conveyed to the tire building apparatus by roll guides or conveyers. These strips are formed by extruding the rubber in a suitable cross-section and then cutting the strips to predetermined lengths depending on the size of the tire. These individual strips are then conveyed to the tire building machine where they are supported in such a manner that the operator of the machine always has moving strips of the necessary length at his immediate disposal.

Since these strips are in a plastic or in a plastic-elastic condition, it is quite common for the strips to be somewhat deformed while they are being conveyed and while they are being supported prior to use. It is necessary, however, that the moving strip be delivered in a straight stretched condition without any deformation therein. Only when the strip is delivered in this condition is it possible for the strip to be accurately positioned on the casing of the tire in the tire building machine.

It is therefore the principal object of the present invention to provide a novel and improved roller guide.

It is a further object of the present invention to provide a roller guide for delivering strips which are in a plastic condition without any deformation therein.

In order to eliminate the disadvantages of the prior art and to attain the objects as set forth above, the roller guide of the present invention comprises lower rollers which are axially displaceable along their longitudinal axes. The guide of the present invention comprises a plurality of equal spaced cylindrical rollers for supporting the lower surface of the strip. These rollers are mounted so as to be axially displaceable along their rotary axes. Compensating springs are provided on both ends of the rollers for urging the rollers into their center positions.

A pair of upper rollers is mounted above each lower roller and engages the inclined edges of the top face of the strip. The upper rollers are not axially displaceable and function to center the strip on the guide. Since the lower surface of the strip tends to adhere to the lower rollers, there is a tendency for the edges of the strip to become deformed as the strip was moved transversely in order to center the same. However, in the guide of the present invention the lower rollers are axially displaceable and accordingly the strip can be readily moved transversely without any deformation of the edges. Since the lower rollers are free to move transversely of the guide in order to accommodate any transverse adjustments of the strip, it can be seen that the strip will not be deformed regardless of any transverse centering movement thereof.

Other objects and advantages of the present invention will be apparent upon reference to the accompanying description when taken in conjunction with the following drawings, wherein—

Figure 2:
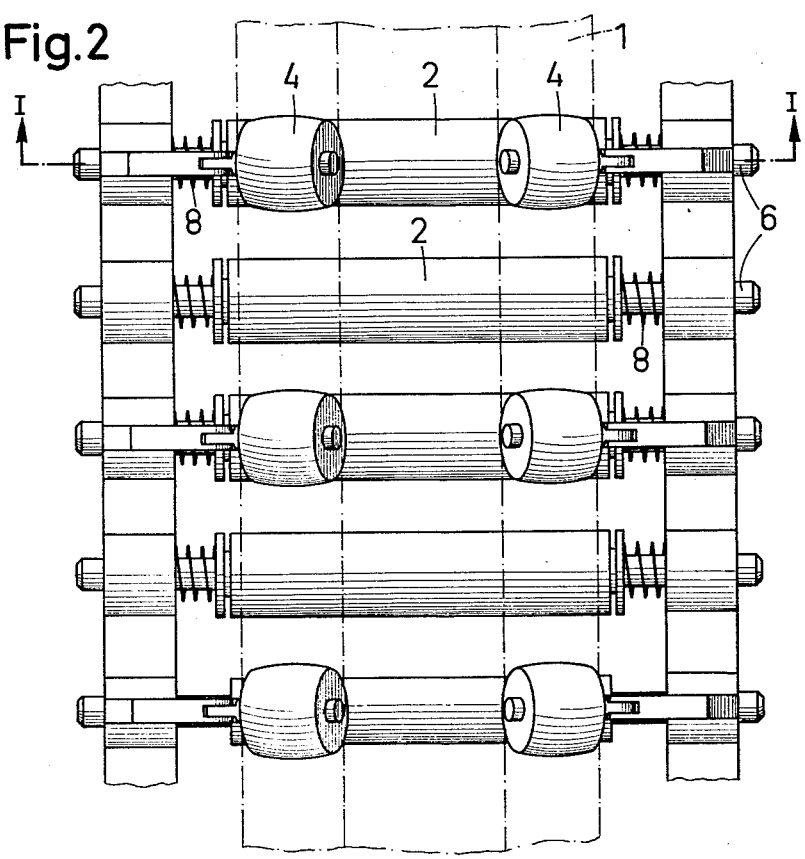

FIGURE 1 is a transverse sectional view of the roller guide of the present invention and taken along the line I—I of FIGURE 2; and FIGURE 2 is a top plan view of the roller guide of this invention.

Referring now to the drawings wherein like reference symbols indicate the same parts throughout the various views, a specific embodiment of this invention will be described in detail.

The strip which is in a plastic state is indicated at 1 and is supported upon a plurality of equal-spaced cylindrical rollers or pulleys 2 which engage the lower surface of a strip indicated at 3. The strip lower surface 3 is ultimately mounted on the casing of the tire. Above each lower roller 2 there is mounted a pair of upper rollers or pulleys 4 whose rotary axes are inclined with respect to the rotary axis of the roller 2. The rollers 4 engage the inclined edges 5 of the top surface of the strip 1 and accordingly have a profile corresponding to the surface of the edge 5. The rollers 4 are not displaceable along their rotary axes.

The lower roller 2 is mounted upon a shaft 6 whose ends are supported in anti-friction ball bearings 7. The shaft 6 is therefore capable of linear movement while being supported by the bearings 7.

Compression springs 8 are provided on each end of the roller 2 between the ends of the roller and the bearings 7. The compression springs 8 are dimensioned so as to have equal strength and accordingly equal forces are exerted to center the roller 2.

In view of their angular positioning the upper rollers 4 center the strips 1 with respect to the guide. While not shown in FIGURE 2 of the drawings, two upper rollers 4 are positioned above each of the lower rollers 2. The rollers 4 are so mounted that they can be adjusted to any angular position depending on the shape and inclination of the edges 5 of the upper surface of the strip 1.

The result obtained from the present invention can be clearly illustrated by considering what happens when a strip which is slightly deformed so as to no longer be straight longitudinally is conveyed onto the roller guides and the lower pulleys 2 are not axially displaceable. In such a strip the deformation can be compensated for by the upper pulleys 4 by moving the strip in the proper direction transversely. However, since the frictional or adhesive force between the moving strip 1 and the lower pulleys 2 is relatively great, the centering of the strip by the upper rollers 4 would not overcome this frictional force. Accordingly, a deformation of the strip 1 along its edges would occur when the strip is moved transversely by the upper rollers 4.

In the present invention, however, the lower rollers 2 are axially displaceable and hence move transversely of the guide together with that portion of the strip 1 which is being centered by the upper rollers 4. It is therefore not necessary to overcome any friction or adhesive force between the moving strip 1 and the supporting rollers 2.

The lower pulley 2 which is at the end of the guide or, when the strips are delivered to a strip-supporting apparatus, in front of the apparatus is fixed against axial displacement. The fixed position of this extreme roller accurately positions the strips delivered from the guide.

Thus it can be seen that the present invention provides a roller guide or conveyor wherein plasic or elastic strips may be centered thereon by upper rollers without introducing any distortion between the lower surface of the strip and the roller supporting the lower surface.

It will be understood that this invention is susceptible to modification in order to adapt it to different usages and conditions and, accordingly, it is desired to comprehend such modifications within this invention as may fall within the scope of the appended claims.

What is claimed as this invention is:

1. A roller guide for plastic or resilient strips used in the manufacture of pneumatic tires, and comprising a plurality of rollers supporting the lower surface of a strip with the lower roller at the delivery end of the guide being fixed against axial displacement along its rotary axis but the remaining lower rollers being axially displaceable along their rotary axes, and a plurality of pairs of rollers engaging the inclined surfaces adjacent the edges of the top face of said strip.

2. A roller guide for plastic or resilient strips used in the manufacture of pneumatic tires, and comprising a plurality of rollers for supporting the lower surface of a strip with the lower roller at the delivery end of the guide being fixed against axial displacement along its rotary axis but the remaining lower rollers being axially displaceable along their rotary axes, compression springs of equal strength on both ends of said axially displaceable lower rollers for centering said rollers, and a plurality of pairs of rollers engaging the incined surfaces adjacent the edges of the top face of said strip.

3. A roller guide for plastic or resilient strips used in the manufacture of pneumatic tires, and comprising a pair of spaced longitudinal frame members, a plurality of equal-spaced cylindrical rollers rotatably mounted between said frame members for supporting the lower surface of a strip, said lower rollers being axially displaceable along their rotary axes, compression springs of equal strength on both ends of said lower rollers for centering said rollers, the lower roller mounted on the delivery end of the guide being fixed against axial displacement, and roller means mounted in said frame above each of said lower rollers for engaging the inclined edges on the upper surface of said strip.

4. A roller guide for plastic or resilient strips used in the manufacture of pneumatic tires, and comprising a pair of spaced longitudinal frame members, a plurality of equal-spaced cylindrical rollers rotatably mounted between said frame members for supporting the lower surface of a strip, said lower rollers being axially displaceable along their rotary axes, compression springs of equal strength on both ends of said axially displaceable lower rollers for centering said rollers, and a pair of transversely spaced rollers mounted in said frame above each of said lower rollers for engaging the inclined edges on the upper surface of said spring, the lower roller mounted on the delivery end of the guide being fixed against axial displacement.

References Cited in the file of this patent

UNITED STATES PATENTS

| | | |
|---|---|---|
| 2,356,010 | Seymour | Aug. 15, 1944 |
| 2,377,018 | Leguillon et al. | May 29, 1945 |
| 2,690,785 | McWilliams | Oct. 5, 1954 |
| 2,759,596 | Keller | Aug. 21, 1956 |
| 3,052,395 | Scott | Sept. 4, 1962 |

FOREIGN PATENTS

| | | |
|---|---|---|
| 418,677 | Great Britain | Oct. 29, 1934 |